July 22, 1958     A. E. SCHOFIELD     2,844,740
MULTIPLE SPARK GAP SWITCH
Filed Oct. 2, 1957
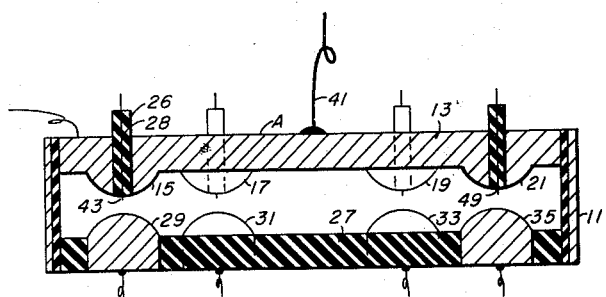
INVENTOR.
Aldred E. Schofield

United States Patent Office 2,844,740
Patented July 22, 1958

2,844,740

MULTIPLE SPARK GAP SWITCH

Aldred E. Schofield, Los Alamos, N. Mex., assignor to the United States of America as represented by the United States Atomic Energy Commission Application October 2, 1957, Serial No. 687,840

6 Claims. (Cl. 307—109)

It has become important in the electronics art that devices be available for connecting a plurality of high potential high current sources to a load simultaneously. For example, laboratory researches into the characteristics and behavior of gaseous plasmas may require the simultaneous connection of a plurality of capacitors to the gaseous discharge tube. The total capacitance required may, for example, be as high or even higher than 200 microfarads charged to a potential having a magnitude up to and exceeding 25 kilovolts. For purposes of economy and circuit considerations, it has been found to be advantageous to utilize a plurality of capacitors hereinafter termed "unit capacitors" rather than one large capacitor of required size. The use of a plurality of small capacitors having a total required capacitance rather than one large capacitor has the advantage that in the event of failure of a unit, only that unit has to be replaced, with a consequent considerable resulting reduction in cost. With respect to circuitry, certain applications of high power sources require an exceedingly high rate of change of current in the load, and the total series inductive resistance of connecting circuitry is much less with the parallel use of a plurality of capacitors than with a single large capacitor.

In the present state of the art the spark gap type of switch is probably the only feasible switch for handling potentials of the order of kilovolts and currents in the hundreds of amperes.

Heretofore no spark gap switch and associated circuitry has been available for the simultaneous connecting of a plurality of charged capacitors to a load. It is a primary object of the present invention to provide a multiple spark gap switch which fulfills this requirement.

This and other objectives and advantages of the present invention will become apparent from the following description and reference to the drawing made a part of this specification.

In the drawing, Figure 1 is a diagrammatic cross section of a multiple spark gap switch in accordance with the present invention. Figure 2 is a top plan view of the switch of Figure 1 and Figure 3 is a diagrammatic view of the circuitry associated in combination with the switch.

Referring to Figures 1 and 2, the multiple spark gap switch of this invention comprises an outer metal housing or ground sleeve 11 which is preferably cylindrical. Supported in one end of the housing 11 but insulated therefrom by dielectric sleeve 12 is a metal common electrode 13 having a plurality of convex protuberances 15–21 equivalent in number to the plurality of energy sources to be controlled. Positioned in the other end of the housing in opposition to the first common electrode and with a spacing sufficient to withstand the potentials with which it is utilized is an insulating disc 27 supporting a plurality of electrodes 29–39 equivalent in number to the protuberances in the first electrode. Electrodes 37 and 39 are not shown but are located similarly to electrodes 23 and 25. The electrodes 29–39 are positioned in opposition to the protuberances in common electrode 13. The common electrode 13, its protuberances and each of electrodes 29–39 are of high conducting material, preferably copper or silver, but may be of any other suitable material. The common electrode 13 is provided with at least one massive connecting wire 41 for connection to a load. Each of the electrodes 29–39 are also provided with connecting wires to permit connection to individual potential sources and each being of a size sufficient to handle the energy supplied from such individual sources.

In order to permit simultaneous firing of each of the spark gaps, each of the spark gaps is provided with an individual trigger probe 43–53. Each trigger probe is supported by a dielectric sleeve 26 in an aperture provided in the center of each of the protuberances of the common electrode 13. Each trigger probe comprises the insulating sleeve 26 and a conductor 28. The conductor 28 extends substantially into the plane of the surface of each of protuberances 15–21.

The individual spark gaps in the multiple spark gap switch are located symmetrically with respect to the center of the switch as shown in Figure 2. Such an arrangement permits symmetrical connections between the switch, the load, and the potential sources, so that the inductive resistance in each branch of the associated wiring will be equalized and therefore have equal time constants.

The manner in which the switch is combined with a triggering system and a load is shown in Figure 3. For purposes of simplicity and explanation, only a two-electrode partial diagramamtic view on section 3—3 of Figure 2 is shown in this figure although it is understood that corresponding connections and circuit elements will be associated with any number of spark gaps. Protuberance 17 is shown to be opposed to insulated electrode 29 and protuberance 19 is shown to be opposed to insulated electrode 33. An individual triggering capacitor is connected to each trigger probe as shown by capacitor 51 being connected to trigger probe 45, and capacitor 53 being connected to trigger probe 47. Each of capacitors 51 and 53 are charged to a potential exceeding that required for break-down between the end of the probe and the adjacent surface of the corresponding protuberance on the common electrode. All of the trigger potential sources, hereinafter termed "trigger capacitors," have one common connection with one pole of a switch 57, the other pole of which is connected to the common electrode 13. It follows from the foregoing that the closure of switch 57, due to its symmetrical arrangement with respect to the trigger capacitors and the trigger probes, fires all trigger probes simultaneously.

The firing of each of the trigger probes results in the generation of a zone of ionized gas in the path between each of the common electrode protuberances and its associated individual electrodes, such as 17 and 31. Each of the individual electrodes is connected to one terminal of a unit capacitor 59, etc. making up the main capacitor bank. The other terminal of each of the unit capacitors are connected together in a symmetrical fashion and to one terminal of a load L. The other terminal of load L is connected to common electrode 13 by means of very heavy connections.

The simultaneous creation of ionized zones between each corresponding pair of electrodes results in breakthrough and therefore simultaneous connection of all the unit capacitors to the load.

The triggering probes have been shown of a type fabricated for the purpose but it is also feasible to utilize internal combustion engine spark plugs for the purpose. In this case, the protuberances would be provided with a centrally located threaded bore to receive the spark plug.

Switch 57 is preferably of the ignitron type which for safety purposes is remotely triggered in a manner well known in the art.

The foregoing describes an embodiment of a multi-circuit simultaneous acting switch for high voltage circuits. This embodiment is chosen for illustrative purposes and modifications are possible within the spirit of this invention. It is understood therefore that the invention is to be considered limited only by the appended claims taken in view of the prior art.

What is claimed is:

1. A high voltage, high current multiple spark gap switch comprising a substantially planar electrode having a pluraltiy of protuberances of generally convex shape on one surface thereof, a firing electrode insulatingly supported in each of said electrode protuberances and extending substantially to the apex thereof, a dielectric plate supported in a plane parallel to that of said electrode and spaced therefrom and supporting a plurality of individual electrodes, each of said electrodes being supported in opposition to one of said protuberances, and terminal connecting means affixed to said electrode and to each of said individual electrodes.

2. The device of claim 1 in which said electrode and said dielectric plate are supported at their edges by a peripheral lining of dielectric material surrounded by a metallic band.

3. The device of claim 2 in which said electrode and said dielectric plate have a circular boundary configuration and said protuberances and individual electrodes are located on a circle.

4. In combination, a multi-pole spark gap switch comprising a metallic plate having a plurality of protuberances on one surface thereof, and a triggering probe insulatingly supported in each of said protuberances and extending through the apex thereof, a plurality of individual electrodes insulatingly supported from each other and each of which is spacedly supported in opposition to a protuberance, a plurality of triggering capacitors each having two terminals, one each of said capacitors having one terminal connected to a respective electrode, the other terminal of all of said triggering capacitors being connected together and to one contact of a triggering switch, the other contact of said triggering switch being connected to said metallic plate; a main condenser being composed of a plurality of unit condensers, each of said unit condensers having two terminals, one each of said unit condensers having one terminal connected to one of said insulated electrodes, the other terminals of all of said unit condensers being connected together and to one terminal of a load, the other terminal of the load being connected to said metallic plate.

5. The device of claim 4 in which the connections between the triggering switch and the said other terminals of said triggering condensers are symmetrically arranged and of equal length.

6. The device of claim 5 in which the connection between the said other terminals of all the unit condensers and the said one terminal of said load are radial connections symmetrical with respect to said load and the center line of said multi-pole spark gap switch.

No references cited.